United States Patent
Lee

(10) Patent No.: US 6,628,384 B2
(45) Date of Patent: Sep. 30, 2003

(54) SPECTROSCOPIC METHOD AND RELATED APPARATUS FOR MEASURING ELECTRODE GAP DISTANCE

(75) Inventor: Szetsen Steven Lee, Taipei (TW)

(73) Assignee: Winbond Electronics Corp. (TW)

( * ) Notice: Subject to any disclaimer, the term of this patent is extended or adjusted under 35 U.S.C. 154(b) by 40 days.

(21) Appl. No.: 09/876,731

(22) Filed: Jun. 7, 2001

(65) Prior Publication Data
US 2002/0008872 A1 Jan. 24, 2002

(30) Foreign Application Priority Data
Jun. 9, 2000 (TW) ........................... 89111249 A

(51) Int. Cl.[7] .................................................. G01J 3/30
(52) U.S. Cl. .................. 356/316; 359/326; 156/345.24; 156/345.15; 216/60; 427/8; 438/16
(58) Field of Search .................... 356/72, 303, 316, 356/326; 156/345.15, 345.24; 216/60; 427/8, 9, 10; 438/16

(56) References Cited

U.S. PATENT DOCUMENTS

| | | | | |
|---|---|---|---|---|
| 4,460,673 A | * | 7/1984 | Sukigara et al. |
| 4,496,448 A | * | 1/1985 | Tai et al. |
| 4,918,033 A | * | 4/1990 | Bartha et al. |
| 5,167,748 A | * | 12/1992 | Hall |
| 5,290,383 A | * | 3/1994 | Koshimizu |
| 5,354,413 A | * | 10/1994 | Smesny et al. |
| 5,621,751 A | * | 4/1997 | Williamson et al. |
| 5,698,901 A | * | 12/1997 | Endo |
| 5,759,424 A | * | 6/1998 | Imatake et al. |
| 6,207,008 B1 | * | 3/2001 | Kijima |
| 6,438,440 B1 | * | 8/2002 | Hayashi |

* cited by examiner

Primary Examiner—Ricky D. Shafer
(74) Attorney, Agent, or Firm—Ladas & Parry

(57) ABSTRACT

This invention provides a method for accurately measuring a gap distance between two electrodes. According to the method, a plasma space is formed between the electrodes, across which a DC voltage is coupled. The plasma space has a reactive gas that emits a spectrum of spectral lines. The spectrum is monitored to determine at least one line distance between the spectral lines. Finally, the gap distance can be deduced according to the line distance and a specific rule.

17 Claims, 2 Drawing Sheets

SPECTROSCOPIC METHOD AND RELATED APPARATUS FOR MEASURING ELECTRODE GAP DISTANCE

BACKGROUND OF THE INVENTION

1. Field of the Invention

The present invention relates to a spectroscopic method and relative apparatus for measuring electrode gap distance. In particular, the present invention relates to an in situ spectroscopic method that obtains a gap distance between electrodes without stopping a plasma process, and related apparatus.

2. Description of the Related Art

In a typical plasma etch chamber, the distance between the top electrode and the processed wafer is of critical importance in determining etching rate. FIG. 1 illustrates a simplified setup in a plasma chamber with a top electrode and wafer at the bottom. The plasma chamber is equipped with a top electrode 10 and a bottom electrode 12. RF power supply is coupled to the electrode 10 and the bottom electrode 12 and provides RF power to the space between them. When the RF power supply is on, numerous electric field lines run between the top and bottom to sustain a plasma space formed between them, and a semiconductor wafer 17 on the bottom electrode 12 can be processed as required. The process speed, such as etch rate, is determined by many parameters, such as the plasma density and the excited state of the ions in the plasma space.

Usually the top electrode is made of Si, SiC and other special materials. The top electrode gradually wears of with use over time. Thus, it is inevitable that the gap becomes larger than when it was initially installed. Since the electric field strength (shown by the electric lines 14 in FIG. 1) depends on the distance between electrodes, the plasma density changes accordingly. This results in an observable change of etch rate (ER).

To prevent this issue, it is a routine for an equipment engineer to calibrate and adjust the gap distance after wet cleaning the chamber. However, the calibration methods are usually rough and not very accurate. For example, several clay blocks are placed in the chamber. When the top lid, on which the top electrode is mounted, is closed, these clay blocks are pressed to a certain thickness. The clay blocks are taken out and their thicknesses are measured by a micrometer. The thickness corresponds to the gap distance. After wet cleaning the chamber, if the ER is not normal and the gap distance is questioned, the chamber needs to be reopened to measure the gap distance. This is time-consuming and inaccurate. The manufacturing process has to be interrupted during the procedure for the calibration of gap distance.

SUMMARY OF THE INVENTION

An object of the present invention is to in situ measure the gap distance. The object of the invention is achieved by observing the spectrum radiated from the plasma space, by which an accurate gap distance can be determined without opening the top lid.

This invention provides a method for measuring a gap distance between two electrodes. According to the method, a plasma space is formed between the electrodes, across which a DC voltage is coupled. The plasma space has a reactive gas that emits a spectrum of spectral lines. The spectrum is monitored to determine at least one line distance between the spectral lines. Finally, the gap distance can be deduced according to the line distance and a specific rule.

An apparatus having ability of in situ measuring a gap distance between electrodes is also provided. The apparatus comprises a DC voltage source, a plasma chamber, a scanning spectrometer and a data processor. The DC voltage source provides a DC voltage bias coupling across the electrodes. The plasma chamber, within which the electrodes are mounted, forms a plasma space between the electrodes when the DC voltage bias is supplied. The scanning spectrometer monitors spectral lines emitted from the plasma space. The data processor determines the gap distance according to a line distance between the spectral lines and a built-in rule.

The line distance between the spectral lines corresponds to the electric field between the electrode and the electric field, which in turn corresponds to the gap distance. This allows the gap distance can be deduced by the line space.

The major advantage of the present invention is that the procedure for obtaining the gap distance can be executed without opening a top lid of a plasma chamber. Thus, the gap distance can be quickly obtained and the manufacturing process is not interrupted.

Another advantage of the present invention is the high accuracy of the measured gap distance. Since it is very easy to distinguish spectral lines emitted by a specific gas from others, the positions (frequencies or wavelengths) of the spectral lines can be accurately found. An accurate line distance and an accurate gap distance can thus be obtained.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1:
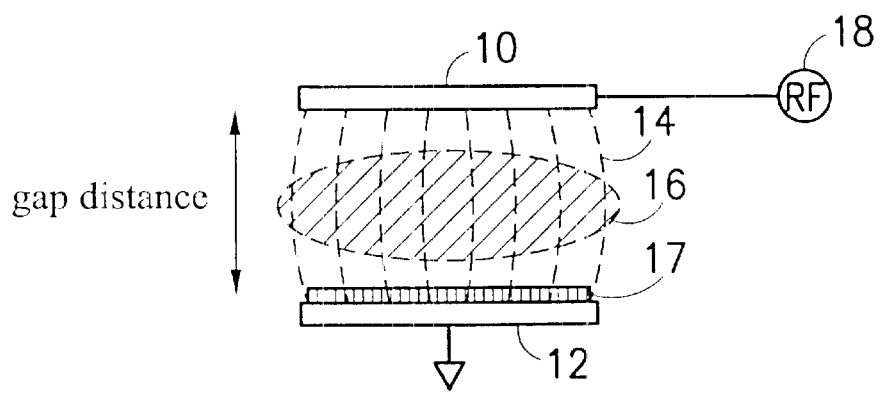
FIG. 1 illustrates a simplified setup in a plasma chamber with a top electrode and wafer at the bottom.
Figure 2:
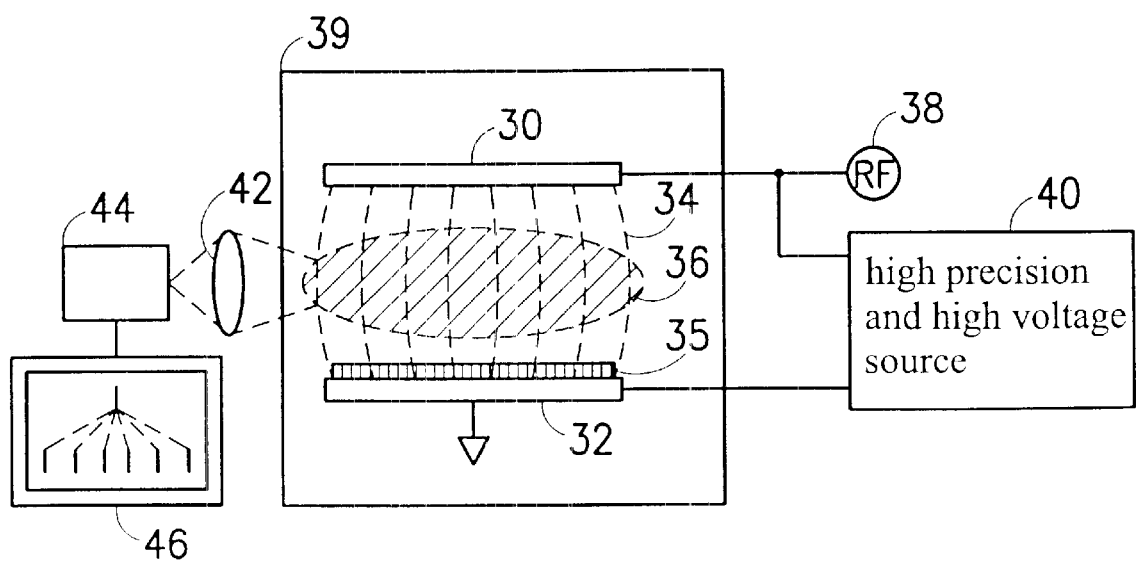
FIG. 2 illustrates a diagram of an apparatus according to the present invention.

FIG. 2 illustrates a diagram of an apparatus according to the present invention. The apparatus according to the present invention is deployed for measuring the gap distance between a top electrode 30 and a bottom electrode 32. The top electrode 30 and the bottom electrode 32 are both mounted inside a plasma chamber 39. Usually the bottom electrode 32 is a conductive plate and acts as a platform for holding a semiconductor wafer 35. When a voltage is applied across the top electrode 30 and the bottom electrode 32, an electric field, as shown by the dash lines 34 in FIG. 2, is formed between the electrodes 30 and 32. A high precision and high voltage source 40 supplies a DC voltage bias across the electrodes 30 and 32. A radio frequency (RF) power source 38 provides the RF power needed for sustaining plasma. If the gap distance between the electrodes, 30 and 32, need to be known, a reactive gas should be introduced into the chamber 39 for the purpose of generating plasma. Under the circumstances conditioned by the DC voltage bias, the RF power and other properly tuned parameters, plasma reaction can occur between the electrodes 30 and 32, which is identified as a plasma space 36 in FIG. 2. The apparatus of the present invention further has a lens set 42, a high precision scanning spectrometer 44 and a data processor 46. While the reactive gas is in the plasma space, a spectrum with several spectral lines is emitted due to electron transmission between different electron quantum states. The emitted spectrum is collected by lens set 42 and is split into the spectral lines. Each spectral line has a corresponding position (frequency or wavelength). The line distance, defined as the position difference between two of the spectral lines, is used as an indicator for the data processor 46 to deduce the gap distance between the electrodes, 30 and 32.

Figure 3:
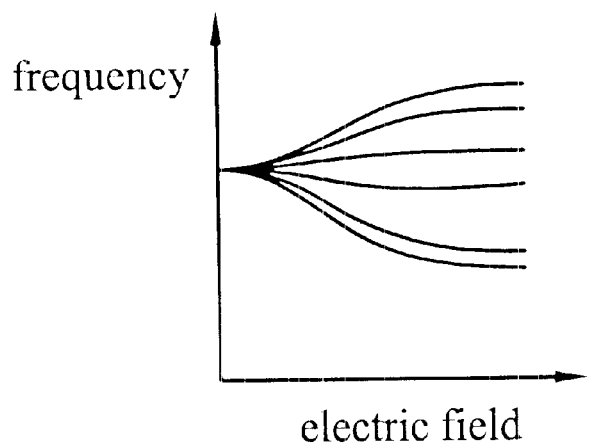
FIG. 3 is a spectrum variation that illustrates Stark effect.

This invention relies on the Stark effect, as taught in quantum mechanics. The Stark effect teaches that, under a perturbation of an electric field, quantum states originally having the same energy level will have several different energy levels, and the difference between the energy levels entirely depends upon the strength of the electric field. As shown in FIG. 3, FIG. 3 is a spectrum variation that illustrates the Stark effect. Each spectral line in a spectrum results from an electron transition between two different quantum states. If the energy level of a certain quantum state changes, the spectral line corresponding to the certain quantum state changes its position (frequency or wavelength) as a result. It is shown in FIG. 3 that one of the root spectral lines in the spectrum will split into six spectral lines and the difference between their positions varies as the perturbing strength of the electric field increases.

According to the Stark effect, if the distance between two spectral lines originating from a root spectral is found, the electric field strength that conducts the split can be deduced. Furthermore, under a fixed DC bias, the strength of an electric field corresponds to a specific gap distance between the electrodes. This constructs a relationship between the line difference of the spectral lines and the gap distance. Such a relationship can be built into the data processor 46 by means of look-up table or a simple mathematical equation.

A high precision voltage source is preferable. Otherwise, noise from an unstable voltage source will obscure the result of the Stark effect such that the gap distance can't be accurately obtained.

In a semiconductor manufacture, helium and hydrogen are two of the most common gases and have smaller atomic numbers, which can contribute to a noticeable result of the Stark effect. Therefore, helium and hydrogen are two gases suggested for measuring the electrode gap distance. Experiments have reported about the Stark effect of hydrogen and helium. For example, the splitting result of the spectral lines radiated by helium atoms and having wavelengths around $438.8*10^{-9}$ meters is well known in the art. Among the reported experiments, the $H_\alpha$ spectral lines which are emitted from Hydrogen atoms and have wavelengths of $656.2*10^{-9}$ meters have the highest split level under a certain electric field. It is known in reports that an electric field perturbation of 10 kV/cm can introduce a position difference for the $H_\alpha$ spectral lines as large as 7.8 cm$^{-1}$.

The spectral lines for deducing the electrode gap distance needn't to be the spectral lines split from a single root spectral line. If a spectral line changes its position due to a perturbation of electric field, it can be expected that the line distance from the spectral line to another spectral line may change too. Therefore, only if we build up a relationship of the line distance between any two spectral lines and the gap distance, which corresponds to the strength of the electric field, the current gap distance can be always deduced from a measured line distance. The major advantage for taking the spectral lines split from a single root spectral line as references is that the distance variation will be more significant and easy to obtain.

Figure 4:
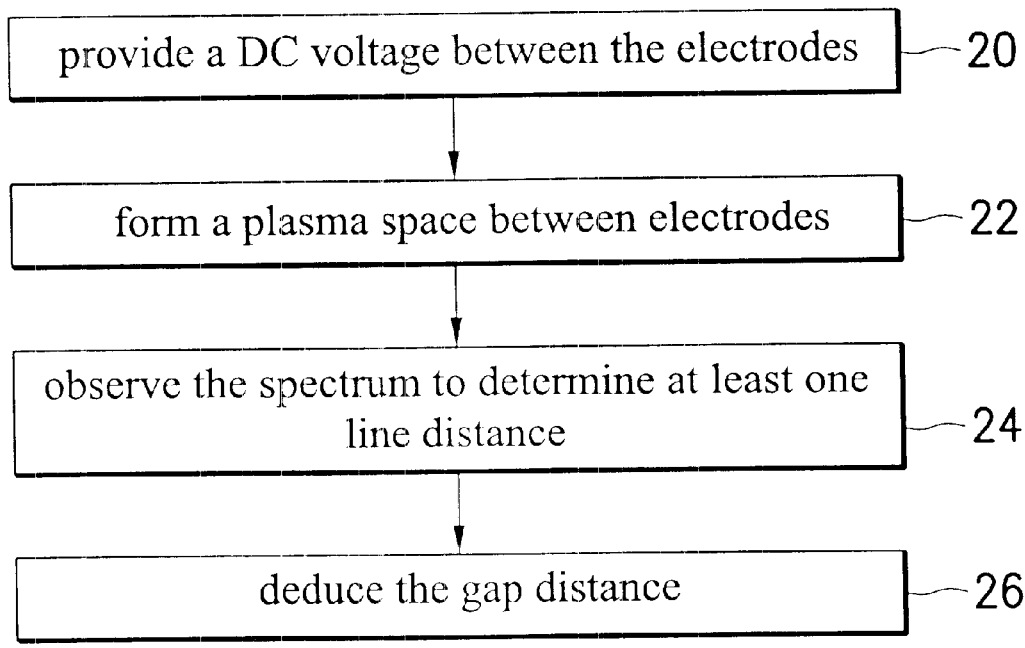
FIG. 4 shows the measuring steps according to the present invention.

In summary, the present invention provides a spectroscopic measurement of electrode gap distance, as shown in FIG. 4. First, provide a DC voltage coupling across the electrodes (symbol 20). In other words, provide a DC voltage field between the electrodes. Second, form a plasma space between the electrodes from where a reactive gas emits a spectrum of several spectral lines (symbol 22). Third, observe the spectrum to determine at least one line distance between the spectral lines (symbol 24). Finally, deduce the gap distance according to the line distance and a specific rule (symbol 26).

In comparison with the conventional measurement method, which requires opening the top lid and is therefore time wasting and inaccurate, the spectroscopic measurement according to the present invention obtains an accurate gap distance by observing the line distance between spectral lines emitted from the plasma space. Opening the top lid becomes unnecessary. Therefore, the present invention simplifies the procedure and shortens the machine down time.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for measuring a gap distance between two electrodes, comprising the following steps:

forming, with a direct-current voltage coupling across the electrodes, a plasma space between the electrodes, the plasma space having a reactive gas which emits a spectrum of spectral lines;

observing the spectrum to determine at least one line distance between the spectral lines; and deducing the gap distance according to a relationship between the line distance and the gap distance.

2. The method as claimed in claim 1, wherein the plasma space is further formed with a radio power coupled to the electrodes.

3. The method as claimed in claim 1, wherein the reactive gas is Hydrogen.

4. The method as claimed in claim 3, wherein the spectral lines have wavelengths around $656.2*10^{-9}$ meters.

5. The method as claimed in claim 1, wherein the reactive gas is Helium.

6. The method as claimed in claim 5, wherein the spectral lines have wavelengths around $438.8*10^{-9}$ meters.

7. The method as claimed in claim 1, wherein the relationship between the line distance and the gap distance is provided by a look-up table.

8. An apparatus for in situ measuring a gap distance between two electrodes, comprising:

a DC voltage source for providing a DC voltage bias coupling across the electrodes;

a chamber enclosing the electrodes, for forming, under the DC voltage bias, a plasma space between the electrodes;

a scanning spectrometer for observing spectral lines emitted from the plasma space; and a data processor for determining the gap distance according to a line distance between the spectral lines.

9. The apparatus as claimed in claim 8, wherein the DC voltage source is a high precision and high voltage source.

10. The apparatus as claimed in claim 8, wherein the apparatus further comprises a RF generator for providing a RF power into the plasma space.

11. The apparatus as claimed in claim 8, wherein the plasma space includes a reactive gas of Hydrogen.

12. The apparatus as claimed in claim 11, wherein the spectral lines have wavelengths around $656.2*10^{-9}$ meters.

13. The apparatus as claimed in claim 8, wherein the plasma space includes a reactive gas of Helium.

14. The apparatus as claimed in claim 8, wherein the spectral lines have wavelengths around $438.8*10^{-9}$ meters.

15. The apparatus as claimed in claim 8, wherein the data processor has a built-in lookup table providing the relationship between the line distance and the gap distance.

16. The apparatus as claimed in claim 8, wherein the chamber is an etch chamber for etching semiconductor wafers.

17. The apparatus as claimed in claim 8, wherein the electrodes comprise a top electrode and a bottom electrode, the plasma space is formed between the top electrode and the bottom electrode, and a semiconductor wafer is disposed above on the bottom electrode.

* * * * *